United States Patent
Bonami et al.

(10) Patent No.: US 12,187,839 B2
(45) Date of Patent: Jan. 7, 2025

(54) POLYETHER POLYOL

(71) Applicant: HUNTSMAN INTERNATIONAL LLC, The Woodlands, TX (US)

(72) Inventors: Lies Bonami, Aalter (BE); Joris Karel Peter Bosman, Herselt (BE); Els Elisabeth Mercier, Overwinden (BE)

(73) Assignee: HUNTSMAN INTERNATIONAL LLC

( * ) Notice: Subject to any disclaimer, the term of this patent is extended or adjusted under 35 U.S.C. 154(b) by 37 days.

(21) Appl. No.: 17/434,781

(22) PCT Filed: Mar. 3, 2020

(86) PCT No.: PCT/EP2020/055552
§ 371 (c)(1),
(2) Date: Aug. 30, 2021

(87) PCT Pub. No.: WO2020/193087
PCT Pub. Date: Oct. 1, 2020

(65) Prior Publication Data
US 2022/0135730 A1  May 5, 2022

(30) Foreign Application Priority Data

Mar. 25, 2019 (EP) ..................................... 19164934

(51) Int. Cl.
| C08G 18/48 | (2006.01) |
| C08G 18/76 | (2006.01) |
| C08G 65/30 | (2006.01) |
| C08G 65/335 | (2006.01) |
| C08K 5/51 | (2006.01) |

(52) U.S. Cl.
CPC ....... *C08G 18/485* (2013.01); *C08G 18/4825* (2013.01); *C08G 18/7664* (2013.01)

(58) Field of Classification Search
None
See application file for complete search history.

(56) References Cited

U.S. PATENT DOCUMENTS

| 2,732,367 A | * | 1/1956 | Shokal | ............... C08G 59/4071 |
| | | | | 523/435 |
| 4,521,548 A | | 6/1985 | Christen et al. | |
| 5,472,987 A | * | 12/1995 | Reedy | ..................... C08L 83/12 |
| | | | | 521/107 |
| 6,191,315 B1 | | 2/2001 | Thankachan et al. | |
| 6,471,905 B1 | * | 10/2002 | Haas | ....................... B29C 33/60 |
| | | | | 524/157 |
| 2003/0158450 A1 | | 8/2003 | Hasselaar et al. | |

FOREIGN PATENT DOCUMENTS

| GB | 1083939 | 9/1967 |
| JP | 2010006964 A | 1/2010 |
| WO | 1993/19113 | 9/1993 |
| WO | 2016/100691 | 6/2016 |

OTHER PUBLICATIONS

International Search Report received in corresponding PCT Application No. PCT/EP2020/055552 completed Mar. 10, 2020 and mailed Mar. 18, 2020.
Written Opinion received in corresponding PCT Application No. PCT/EP2020/055552 completed Mar. 10, 2020 and mailed Mar. 18, 2020.
Office Action issued Apr. 28, 2023 in Corresponding Indian Application No. 202117042666.
Office Action issued Feb. 27, 2024 in Corresponding Chinese Application No. 2020800238920.

* cited by examiner

*Primary Examiner* — Melissa A Rioja
(74) *Attorney, Agent, or Firm* — HUNTSMAN INTERNATIONAL LLC; Lewis Craft

(57) ABSTRACT

The present invention relates to a process for providing a homogeneous polyether polyol composition comprising the following steps: Providing a crude polyether polyol mixture comprising polyether polyol and a Group IA or Group IIA metal ion; Neutralisation of said crude polyether polyol mixture by adding a strong acid to said mixture, resulting in a neutralised polyether polyol composition, which comprises said polyether polyol along with a salt of said Group IA or Group IIA metal ion and said strong acid; Providing said homogeneous polyether polyol composition. characterised in that said strong acid is a pentavalent organic phosphorus compound, and in that said salt is a phosphorus-containing compound based organic salt, which is soluble in said polyether polyol composition.

9 Claims, No Drawings

POLYETHER POLYOL

The present invention relates to a process for providing a homogeneous polyether polyol composition, which process comprises the following steps:
- Providing a crude polyether polyol mixture, which comprises a polyether polyol and a Group IA or Group IIA metal ion;
- Neutralisation of said crude polyether polyol mixture by adding a strong acid to said mixture, resulting in a neutralised polyether polyol composition, which comprises said polyether polyol along with a salt of said Group IA or Group IIA metal ion and said strong acid;
- Providing said homogeneous polyether polyol composition.

Methods for preparing polyether polyols, also referred to as poly (alkylene oxide) polyols, typically involve reacting a starting compound having a plurality of active hydrogen atoms with one or more alkylene oxides in the presence of a base catalyst, preferably a strong base, such as potassium hydroxide. Examples of suitable starting compounds are polyfunctional alcohols, typically comprising 2 to 6 hydroxyl groups. Examples of such alcohols are glycol, e.g. diethylene glycol, dipropylene glycol, glycerol, di- and polyglycerols, pentaerythritol, trimethylolpropane, diethanolamine, triethanolamine, sorbitol, mannitol, etc.

Alkylene oxides commonly used are ethylene oxide, propylene oxide, butylene oxide or mixtures of two or more of these.

After the addition of alkylene oxides to the starting compound, an alkaline crude polyether polyol mixture is obtained, which needs neutralisation of the base catalyst.

After neutralisation, several steps are required to provide a polyether polyol, which meets the specifications for further use of the polyether polyol composition, as raw material, in polyurethane (PU) manufacturing (flexible and/or rigid applications). In PU applications, polyether polyol can be reacted with polyisocyanate compounds, such as methylene diphenyl diisocyanate (MDI) or toluene diisocyanate (TDI).

Generally, there are several types of processes for working up the crude polyether polyol mixture. One of these processes involves the formation of a salt, which precipitates in the medium, and which is then filtered off, in order to collect the polyether polyol composition in the end of the process.

However, such processes are complex, expensive and not sufficiently reliable.

WO 93/19 113 discloses a process, wherein use is made of an inorganic acid, which is present at a concentration, at which the inorganic acid is soluble in the crude polyether polyol mixture and in the salt formed in the polyether polyol composition.

However, this process needs an extraction of a part of the base catalyst before neutralisation, which makes such process complex and not convenient for the user. Moreover, the colour of the polyether polyol composition will increase over time, in particular when an increase of temperature is applied to the composition. An increase of coloration can be linked to the fact that side reactions occur, which should be avoided.

There is therefore a need to provide a process which can be cost-efficient, simple and reliable at industrial level. And, also a process that does not necessarily need any further work-up of the crude polyether polyol mixture before and after neutralisation.

It is an object of the present invention to overcome the aforementioned drawbacks by providing a process, which can guarantee that the colour of the polyether polyol composition is maintained over time, when used for the manufacturing of different types of products, for instance polyurethane products, even when an increase of temperature can be applied. In addition, the process of the present invention should be simple and convenient for the user.

In this respect, the present invention provides a process as disclosed hereinbefore, characterised in that said strong acid is a pentavalent organic phosphorus compound, and in that said salt is a phosphorus-containing compound based organic salt, which is soluble in said polyether polyol composition.

In the present invention, it has been unexpectedly discovered that using pentavalent organic phosphorus compound for neutralising the crude polyether polyol mixture, enables providing a homogeneous polyether polyol composition. Said phosphorus-containing compound organic based salt, which is formed after neutralisation is, preferably completely, soluble in said polyether polyol composition.

In addition, the presence of said phosphorus-containing compound based organic salt does not adversely affect the color of the homogeneous polyether polyol composition over time, which can thereby be used in several applications, e.g. for the manufacturing of polyurethane products.

Moreover, the salt of the present invention has less trimerisation catalytic activity in the polyether polyol composition, when reacted with isocyanate containing compounds and compared with known polyether polyol composition.

It has also been observed that a decrease of the initial color of the polyether polyol composition of the present invention can be observed and which was also unexpected.

The present invention provides a process, which is cost-efficient and convenient for the user, who does not need to filter off or remove any salt, for using the polyether polyol composition in an efficient way in several fields of applications.

Furthermore, in a particular embodiment, the process is convenient, since it is possible to apply the process of the present invention in one reactor, which is also cost efficient in case of industrial-scale application.

Preferably, said crude polyether polyol mixture comprises a Group IA or Group IIA metal ion up to 4800 ppm, preferably up to 4700 ppm, more preferably up to 4600 ppm, even more preferably up to 4500 ppm.

Advantageously, said crude polyether polyol mixture comprises up to 4000 ppm, preferably up to 3800 ppm, more preferably up to 3600 ppm of said Group IA or Group IIA metal ion. This is advantageous, since the kinetic of the alkoxylation reaction for forming said crude polyether polyol mixture is performed more rapidly, compared with less amount of such metal ion, while guaranteeing that the obtained salt, after neutralisation, remains soluble in the polyether polyol composition. This reduces the time necessary for manufacturing polyether polyol composition and the formation of waste. There is no need to apply any work-up step (e.g. extraction) before performing neutralisation step.

More preferably, said pentavalent organic phosphorus compound is selected from the group consisting of organic phosphoric acid, organic phosphonic acid, organic phosphinic acid, derivatives and mixtures thereof.

Advantageously, wherein said pentavalent organic phosphorus compound is selected from the group consisting of mono-alkyl dihydrogen phosphate, dialkyl hydrogen phosphate, alkyl phosphonic acid, alkyl alkyl phosphonic acid, dialkylphosphinic acid, derivatives and combinations thereof.

In the context of the present invention, is has been discovered that said pentavalent organic phosphorus compound has a high degree of compatibility with a large list of polyether polyol composition (for rigid and/or flexible applications), which is particularly advantageous. In other words, this gives the user the latitude in selecting several types of polyether polyols.

Advantageously, said pentavalent organic phosphoric compound is selected from the group consisting of dimethyl hydrogen phosphate, methyl dihydrogen phosphate, diethyl hydrogen phosphate, ethyl dihydrogen phosphate, dipropyl hydrogen phosphate, propyl dihydrogen phosphate, dibutyl hydrogen phosphate, butyl dihydrogen phosphate, dipentyl hydrogen phosphate, pentyl dihydrogen phosphate, dihexyl hydrogen phosphate, hexyl dihydrogen phosphate, diheptyl hydrogen phosphate, heptyl dihydrogen phosphate, dioctyl hydrogen phosphate, octyl dihydrogen phosphate, bis(1-methylheptyl) hydrogen phosphate, 1-methylheptyl dihydrogen diphosphate, bis(2-ethyl-hexyl) hydrogen phosphate, 2-ethyl-hexyl dihydrogen phosphate, didodecyl hydrogen phosphate, dodecyl dihydrogen phosphate, dioleyl hydrogen phosphate, oleyl dihydrogen phosphate, dibenzyl hydrogen phosphate, benzyl dihydrogen phosphate, diphenyl hydrogen phosphate, phenyl dihydrogen phosphate, methyl phenyl hydrogen phosphate, nonyl phenyl hydrogen phosphate, butyl phenyl hydrogen phosphate, ethyl phenyl hydrogen phosphate, bis(p-nonylphenyl) hydrogen phosphate, p-nonylphenyl dihydrogen phosphate, butyl(2-ethylhexyl) hydrogen phosphate, 2-ethylhexyl dihydrogen phosphate, (1-methylheptyl) (2-ethylhexyl) hydrogen phosphate, (2-ethylhexyl)(p-nonylphenyl) hydrogen phosphate, methyl phosphonic acid, ethyl phosphonic acid, propyl phosphonic acid, butyl phosphonic acid, phenyl phosphonic acid, benzyl phosphonic acid, ethyl methyl phosphonic acid, butyl methyl phosphonic acid, 2-ethylhexyl butylphosphonic acid, 2-ethylhexyl (2-ethylhexyl) phosphonic acid, mono-2-ethylhexyl phenyl phosphonic acid, dibutylphosphinic acid, bis(2-ethylhexyl) phosphinic acid, bis(1-methylhepthyl) phosphinic acid, dioleylphosphinic acid, diphenylphosphinic acid, bis(p-nonylphenyl)phosphinic acid, butyl(2-ethylhexyl) phosphinic acid, (2-ethylhexyl) (1-methyl-heptyl) phosphinic acid, (2-ethyl-hexyl)(p-nonylphenyl) phosphinic acid, and mixtures thereof.

According to a preferred embodiment of the process of the present invention, said strong acid has a pKa lower than 5, preferably ranging from 0.05 to 4.5, more preferably from 1.2 to 3.

According to an advantageous embodiment of the present invention, said crude polyether polyol mixture is obtained by reacting a starting compound having at least one active hydrogen atom with at least one alkylene oxide, preferably selected in the group consisting of ethylene oxide, propylene oxide and mixtures thereof, in the presence of a base catalyst.

The base catalyst of the present invention can be cesium hydroxide, potassium hydroxide, sodium hydroxide or any other equivalent compound, based on Group IA or Group IIA metal ion.

Advantageously, said starting compound comprises 1 to 8 hydroxyl groups or primary/secondary amine groups.

In a preferred embodiment, said starting compound comprises at least one functional alcohol, preferably monofunctional alcohol or polyfunctional alcohol, which comprises 1 to 8 hydroxyl groups.

More advantageously, said starting compound is selected from the group consisting of diethylene glycol, propylene glycol, dipropylene glycol, glycerol, diglycerol, polyglycerols, pentaerythritol, trimethylolpropane, diethanolamine, triethanolamine, sorbitol, mannitol, sucrose, ethylene diamine, oligomeric diphenyl methane diamine, toluene diamine, Mannich bases, and mixtures thereof.

Other embodiments of the process of the present invention can be mentioned in the annexed claims.

The present invention also relates to a homogeneous polyether polyol composition made of polyether polyol and a phosphorus-containing compound based organic salt, which is, preferably completely, soluble in said polyether polyol composition.

Advantageously, the process of the present invention comprises a dehydration step after neutralisation, in order to provide a dried polyether polyol composition. In this particular case, the water content in the polyether polyol can preferably be lower than 2 wt %, more preferably lower than 1 wt %, even more preferably lower than 0.1 wt %, based on the total weight of the polyether polyol composition.

Other embodiments of the homogeneous polyether polyol composition of the present invention can be mentioned in the annexed claims.

The present invention concerns a reaction mixture comprising at least one homogeneous polyether polyol composition obtained according to the present invention and at least one isocyanate containing compound.

Other embodiments of the reaction mixture of the present invention can be mentioned in the annexed claims.

The present invention also relates to polyurethane product obtained by reacting the components of the reaction mixture of the present invention.

According to a preferred embodiment of the present invention, a foam can be obtained by reacting the components of a reaction mixture according to the present invention and by curing said reaction mixture for manufacturing the foam.

The homogeneous polyether polyol composition of the present invention can be used in foams, coatings, adhesives, elastomers and resins.

Other embodiments of the foam of the present invention can be mentioned in the annexed claims.

The polyether polyol composition of the present invention is suitable for manufacturing polyurethane foams, in particular flexible or rigid foams.

The present invention concerns a homogeneous polyether polyol composition obtained by applying the following steps:
  Providing a crude polyether polyol mixture, which comprises a polyether polyol and a Group IA or Group IIA metal ion;
  Neutralisation of said crude polyether polyol mixture by adding a strong acid to said mixture, resulting in a neutralised polyether polyol composition, which comprises said polyether polyol along with a salt of said Group IA or Group IIA metal ion and said strong acid;
  Providing said homogeneous polyether polyol composition; characterised in that said strong acid is a pentavalent organic phosphorus compound, and in that said salt is a phosphorus-containing compound based organic salt, which is soluble in said homogeneous polyether polyol composition.

Preferably, said crude polyether polyol mixture comprises a Group IA or Group IIA metal ion up to 4800 ppm, preferably up to 4700 ppm, more preferably up to 4600 ppm, even more preferably up to 4500 ppm.

According to a preferred embodiment of the present invention, said strong acid has a pKa lower than 5, preferably ranging from 0.05 to 4.5, more preferably from 1.2 to 3.

More preferably, said pentavalent organic phosphorus compound is selected from the group consisting of organic phosphoric acid, organic phosphonic acid, organic phosphinic acid, derivatives and mixtures thereof.

Advantageously, said pentavalent organic phosphorus compound is selected from the group consisting of monoalkyl dihydrogen phosphate, dialkyl hydrogen phosphate, alkyl phosphonic acid, alkyl alkyl phosphonic acid, dialkylphosphinic acid, derivatives and combinations thereof.

All features and advantages recited for the process for providing a polyether polyol composition according to the present invention hereinabove and in the annexed claims are also applicable to the homogeneous polyether polyol composition obtained by the aforementioned steps.

Other embodiments of the homogeneous polyether polyol composition of the present invention can be mentioned in the annexed claims.

The above and other characteristics, features and advantages of the present invention will become apparent from the following detailed description, which illustrates, by way of example, the principles of the invention. This description is given for the sake of example only, without limiting the scope of the invention.

The present invention will be described with respect to embodiments.

The term "soluble" used in the present invention should be understood as meaning that the salt formed in the process after neutralisation is dissolved in the polyether polyol composition of the present invention. This solubility is visually observed by the fact that the salt does not precipitate in the polyether polyol composition. This results in a homogeneous polyether polyol composition, one single phase composition.

The term "homogeneous" used in the context of the present invention in conjunction with the expression "polyether polyol composition" should be understood as meaning that the substance(s), referred hereinafter as the salt or the strong acid of the present invention will remain in the polyether polyol composition over time (no precipitation or hazy solution).

The expression "phosphorus-containing compound based organic salt" refers to the salt formed when the process of the present invention is applied. This salt results from the type of metal ion present in the crude polyether polyol mixture and the type of acid used for neutralisation. Since the acid, is a pentavalent organic phosphorus compound, the resulted organic salt comprises phosphorus atom.

According to some embodiments of the present invention, the strong acid can be added to the crude polyether polyol mixture as an aqueous acid solution.

In addition, an excess amount of acid can be used for neutralisation, in order to provide polyether polyol composition, which is stable over time (storage). Complete neutralisation of the crude polyether polyol mixture is guaranteed.

In a preferred embodiment of the present invention, the reaction between alkylene oxides and alcohol groups during the polymerization of the polyether polyol, is typically performed in the presence of a base catalyst such as an alkali metal hydroxide, e.g. sodium hydroxide, potassium hydroxide or cesium hydroxide, or mixtures thereof, whereas most preferably potassium hydroxide is used.

The amount of catalyst used to provide the crude polyether polyol mixture can be in the range of 0.05 to 2 wt %, preferably 0.05-1 wt %, more preferably in the range of 0.10 to 0.5 wt %, and most preferred in the range of 0.13 to 0.40 wt %, based on the total weight of the polyether polyol to be prepared in the crude polyether polyol mixture during polymerization reaction.

The crude polyether polyol mixture is provided by catalytically polymerizing a starting compound with alkylene oxides (also referred to as epoxides). Suitable starting compounds can have 1 to 8 hydroxyl group(s). Examples of such alcohols are glycols, e.g. diethylene glycol, dipropylene glycol, glycerol, di- and polyglycerols, pentaerythritol, trimethylolpropane, diethanolamine, triethanolamine, sorbitol, mannitol, ethylene glycol, 1,2-propylene glycol, sucrose, 1,2,6-hexanetriol, or polyamines such as ethylene diamine and diaminodiphenyl-methane (MDA), and any combination thereof. Water can also be used as starting compounds.

The alkylene oxides used are typically ethylene oxide (EO), propylene oxide (PO), butylene oxide (BO) or mixtures of two or more of these.

The polyether polyol comprising more than one type of alkylene oxide may be a so-called block polyether comprising at least two different alkylene oxides, obtained e.g. by reacting the starting compound with one of the alkylene oxide components. After termination of this polyaddition reaction, the intermediate polyether polyol is reacted with any other of the alkylene oxides. This sequential addition of blocks of alkylene oxides can be repeated. As such blocks of different alkylene oxides are added to the polyether polyol.

The polyether polyol comprising more than one type of alkylene oxide may be a so-called random polyether comprising at least two different alkylene oxides, obtained e.g. by reacting the starting compound with a combination of at least two different alkylene oxide components. After termination of this polyaddition reaction, the different alkylene oxides will be at random in the sequences of the polyether chains.

It is understood that also a combination of blocks of only one alkylene oxide, and blocks of at random placed alkylene oxides may be provided to the polyether polyols.

Though polyols with an EO content up to 100% can be used, most preferably, the polyether polyol comprises less than 80% EO, an EO content of 5 to 80% EO, and most preferred an EO content in the range of 5 to 35% such as in the range of 10 to 30%. The EO content is the number of EO-monomers in the polyol over the total of alkyloxide monomers in the polyol, expressed as a percentage.

In a preferred embodiment, polyol with an EO content of about 0 wt % or equal to 0 wt % is also advantageously used.

These EO may be present at random or as blocks and are preferably combined with PO in the polyether polyol.

Most preferably the polyether polyol is a combined EO-PO polyether polyol, meaning that the polyether polyol is provided by reacting the starting component with alkylene oxides selected from EO and PO only, and this at random or in sequences to provide block polymers.

The polyether polyols may be EO or PO tipped, which means that at least the last alkylene oxide added to the polyol is an EO or PO respectively.

According to some embodiments of the present invention, the EO content of the polyether polyol may be in the range of 0 to 80 wt %.

Preferably, the Group IA or Group IIA metal ion is selected from the group consisting of potassium, sodium, cesium, barium, and mixtures thereof.

Neutralisation step can be performed by adding a strong acid to said crude polyether polyol mixture. The excess of acid is determined by the specification of acidity of the polyether polyol, this is expressed in mg KOH/g. The specifications are 0.01-0.1 mg KOH/g. Advantageously, an equivalent of 0.05 mg KOH/g extra is added to the polyether polyol. The volume will depend on the molecular weight of the acid (0.05 mg KOH/g=0.00089 mg H+/g). The skilled person is aware of how neutralisation should be performed, in particular when acid is added in excess to the crude polyether polyol mixture.

In a particular embodiment of the present invention, the strong acid of the present invention is selected from the group consisting of mono-alkyl dihydrogen phosphate, dialkyl hydrogen phosphate, alkyl phosphonic acid, alkyl alkyl phosphonic acid, dialkylphosphinic acid, derivatives and combinations thereof.

According to a preferred embodiment, dialkylphosphinic acid has the following formula (I):

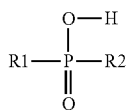

(I)

Wherein,

R1 and R2 are preferably the same or different and are each C1-C26 alkyl, C2-C18-alkenyl, C6-C18-aryl, C7-C18-alkylaryl.

More preferably, R1 and R2 are the same or different and are selected from the group consisting of methyl, ethyl, n-propyl, isopropyl, n-butyl, isobutyl, tert-butyl, n-pentyl, isopentyl, n-hexyl, isohexyl, benzyl, phenyl, octyl, n-octyl, iso-octyl, hepyl, n-heptyl, iso-heptyl, and combinations thereof.

For instance, Bis(2,4,4-trimethylpentyl)phosphinic acid.

According to a particular embodiment of the present invention, alkyl phosphonic acid has the following formula (II):

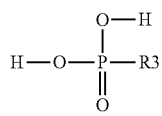

(II)

R3 is preferably selected from the group consisting of C1-C26 alkyl, C2-C18-alkenyl, C6-C18-aryl, C7-C18-alkylaryl.

More preferably, R3 is selected from the group consisting of methyl, ethyl, n-propyl, isopropyl, n-butyl, isobutyl, tert-butyl, n-pentyl, isopentyl, n-hexyl, isohexyl, benzyl, phenyl, octyl, n-octyl, iso-octyl, hepyl, n-heptyl, iso-heptyl, and combinations thereof.

According to a preferred embodiment of the present invention, said strong acid alkyl alkyl phosphonic acid has the following formula (III):

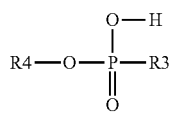

(III)

Preferably R3 and R4 are the same or different and are each C1-C26 alkyl, C2-C18-alkenyl, C6-C18-aryl, C7-C18-alkylaryl.

More preferably, R3 and R4 are the same or different and are selected from the group consisting of methyl, ethyl, n-propyl, isopropyl, n-butyl, isobutyl, tert-butyl, n-pentyl, iso-pentyl, n-hexyl, isohexyl benzyl, phenyl, octyl, n-octyl, iso-octyl, hepyl, n-heptyl, iso-heptyl, and combinations thereof.

According to a particular embodiment of the present invention, the strong acid is selected from the group consisting of mono-alkyl dihydrogen phosphate, dialkyl hydrogen phosphate, derivatives and mixtures thereof.

The strong acid has advantageously the following formula (III):

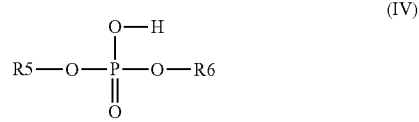

(IV)

Preferably R5 and R6 are the same or different and are each C1-C26 alkyl, C2-C18-alkenyl, C6-C18-aryl, C7-C18-alkylaryl, or hydrogen.

More preferably, R5 and R6 are the same or different and are selected from the group consisting of methyl, ethyl, n-propyl, isopropyl, n-butyl, isobutyl, tert-butyl, n-pentyl, iso-pentyl, n-hexyl, isohexyl benzyl, phenyl, octyl, n-octyl, iso-octyl, hepyl, n-heptyl, iso-heptyl, and combinations thereof.

The neutralisation step enables forming the neutralised polyether polyol composition. The neutralisation preferably consists in a complete neutralisation of the crude polyether polyol mixture.

According to some embodiments of the present invention, an aqueous acid solution may be used to neutralize the crude polyether polyol mixture.

In the present invention, the base catalyst can be for instance NaOH or KOH, and the strong acid can be dibutyl hydrogen phosphate. Neutralisation step can be performed by adding for instance between 1.00 to 1.1 moles of dibutyl hydrogen phosphate for each mole of KOH or NaOH.

When the process is performed according to the present invention, one embodiment consists in applying a temperature between 25 to 160° C., preferably between 50 to 150° C. to the crude polyether polyol mixture. This temperature can be kept for a certain time, from 0.5 to 10 hours, preferably up to 7 hours, more preferably up to 6 hours, during or after neutralisation.

After (preferably complete) neutralisation, the resulting polyether polyol composition comprises polyether polyol of the present invention along with an organic salt. The latter is formed by the reaction occurring between Group IA or Group IIA metal containing base catalyst and said strong acid, providing a neutralized polyether polyol mixture, optionally removing at least part of the water from the neutralized polyether polyol mixture. In the end of the process, polyether polyol composition is obtained, wherein said organic salt is completely soluble in the composition. Advantageously, the polyether polyol composition is dried (dehydration step).

The present invention provides a homogeneous polyether polyol composition, which is ready to be used, e.g., in manufacturing polyurethane products. The complete dissolution of the salt is visually assessed in the end of the process.

Consequently, the removal of the salt is not necessary.

Polyether polyol A: is a glycerol started EO/PO polyether polyol with an OH value of 43 mg KOH/g and an EO-content of 74.7 wt %.

Polyether polyol C: is a dipropylene glycol started EO/PO polyether polyol with an OH value of 43 mg KOH/g and an EO-content of 16 wt %.

Polyether polyol F: is a sucrose-diethylene glycol started PO polyether polyol with an OH value of 440 mg KOH/g.

In the present invention, the OH value (also referred as OH number or OH content) can be measured according to ASTM D1957 standard and is expressed in mg KOH/g. OH value can also be determined by reacting the hydroxyl groups with an acid anhydride and titrating the acid liberated with potassium hydroxide solution. The unit for OH value is expressed in mg KOH/g polyol. OHv=(56.1 g/mol KOH× polyol functionality×1000)/(molecular weight).

The amount of K$^+$ in the crude polyether polyol can be determined by atomic absorption spectroscopy. Alternatively, this amount can be determined by calculating the amount of KOH added to the mixture.

EXAMPLE 1

100 g of polyether polyol A is heated to 90° C. under nitrogen atmosphere. Under stirring, 0.26 wt % KOH was added to said polyether polyol (36 wt % KOH solution in water). The resulting crude polyether polyol mixture is stirred for 30 minutes at 90° C. The amount of K$^+$ in the crude polyether polyol mixture is equal to 1812 ppm. 100 g of the crude polyether polyol mixture is heated to 90° C. under nitrogen atmosphere. 1.002 g of dibutyl hydrogen phosphate is added to the crude polyether polyol mixture, which is stirred for 30 minutes at 90° C. until complete neutralisation is reached. Then, the neutralised polyether polyol composition is cooled down to room temperature.

Dehydration of the polyether polyol composition is performed at reduced pressure 10 mbar, while increasing the temperature stepwise to 120° C.

There is no observation of any precipitate in the final polyether polyol composition, which is homogeneous, visually clear and thereby ready to be used in PU applications.

EXAMPLE 2

In this embodiment, example 1 is reproduced, except that use is made of other types of strong acids, as illustrated in Table 1.

TABLE 1

| Strong acids | amounts (g) |
|---|---|
| Dibenzyl hydrogen phosphate (20 wt % solution in water) | 6.57 |
| Bis(2-Ethylhexyl) hydrogen phosphate (20 wt % solution in water) | 7.62 |
| Mix of dibutyl hydrogen phosphate and butyl dihydrogen phosphate | 0.73 |

Table 1 shows the amounts of strong acids used to perform the neutralisation. For all embodiments illustrated in table 1, a clear and homogeneous polyether polyol composition is obtained, and no coloration of the polyether polyol composition is observed over time, which is particularly advantageous.

EXAMPLE 3

100 g of polyether polyol F was heated to 90° C. under nitrogen atmosphere. Under stirring, 0.26 wt % KOH was added to said polyether polyol (36 wt % solution in water). The resulting crude polyether polyol mixture is stirred for 30 minutes at 90° C.

The amount of r in the crude polyether polyol mixture is equal to 1812 ppm. 100 g of the crude polyether polyol mixture is heated to 90° C. under nitrogen atmosphere. 1.002 g of a strong acid (as illustrated in table 2) is added to the crude polyether polyol mixture, which is stirred for 30 minutes at 90° C. until complete neutralisation is reached. Then, the neutralised polyether polyol composition is cooled down to room temperature.

Dehydration of the polyether polyol composition is performed at 10 mbar and by increasing the temperature stepwise to 120° C.

Table 2 illustrates the types and amounts of strong acids used to neutralise the crude polyether polyol mixture, as recited hereinabove, and the results when the polyether polyol composition is obtained.

TABLE 2

| Strong acid | Amounts (g) | Results |
|---|---|---|
| Dibutyl hydrogen phosphate | 1.002 | Clear |
| Dibenzyl hydrogen phosphate (20 wt % solution in water) | 6.57 | Clear |
| Bis(2-Ethylhexyl) hydrogen phosphate (20 wt % solution in water) | 7.62 | Clear |
| Mix of dibutyl hydrogen phosphate and butyl dihydrogen phosphate | 0.728 | Clear |

COMPARATIVE EXAMPLE 1

Example 1 is reproduced with the addition of 0.74 g of KOH (36 wt % KOH solution in water) in the presence of an inorganic acid. The obtained crude polyether polyol mixture is heated to 90° C. under nitrogen atmosphere. 1.21 g of a 20 wt % H$_3$PO$_4$ solution was added and stirred for 30 min at 90°, until complete neutralisation is reached. The neutralized polyether polyol composition is cooled down to room temperature. The amount of K$^+$ in the crude polyether polyol mixture is equal to 1874 ppm.

Table 3 shows the results when H$_3$PO$_4$ solution is used, as well as other types of acids are used.

TABLE 3

| Acids | amounts (g) | Results |
|---|---|---|
| H$_3$PO$_4$ (20 wt % in water) | 1.21 | Salt and coloring |
| HCl (20 wt % in water) | 0.89 | Salt |
| HNO$_3$ (20 wt % in water) | 1.495 | Hazy |
| H$_2$SO$_4$ (20 wt % in water) | 1.17 | Hazy |
| Methane sulfonic acid (20 wt % in water) | 2.35 | Salt |
| pToluene sulfonic acid (20 wt % in water) | 4.50 | Salt |
| 4-Dodecylbenzenesulfonic acid (20 wt % in water) | 7.71 | Hazy |

For all comparative examples referred in table 3 above, white salt precipitates and/or the polyether polyol compositions are not homogeneous and are haziness solutions.

All neutralisations were calculated for a single deprotonation step, except for $H_2SO_4$ and $H_3PO_4$, which necessitate a double deprotonation step.

COMPARATIVE EXAMPLE 2

Example 1 is reproduced with 99 g of polyether polyol C mixed with 0.71 g of 36 wt % of KOH solution. 99.71 g of the obtained crude polyether polyol mixture is heated to 90° C. under nitrogen atmosphere.

The amount of $K^+$ in the crude polyether polyol mixture is equal to 2158 ppm. 7.68 g of 20 wt % of 4-dodecylbenzylsulfonic acid solution is added and stirred for 30 min at 90° C., until neutralisation is reached. The neutralized polyether polyol composition is then cooled down to room temperature.

Salt precipitation is observed and when dehydration is performed at 10 mbar, while increasing the temperature stepwise to 120° C., the color of the polyether polyol composition becomes yellow-brown and a little bit hazy.

Application Test—Foam

A foam composition is obtained by mixing the components mentioned hereinbelow.

Table 4

A first polyol formulation is provided by using at least one polyether polyol obtained according to the present invention (polyether polyol/water/PO, OH value of 510 and functionality of 5.5) in the presence of a flame retardant, and a catalyst. The polyether polyol composition has been obtained by using dibutyl hydrogen phosphate according to the process of the present invention.

The formulation is then foamed in the presence of a blowing agent and Suprasec® 5025 polymeric MDI (Huntsman).

Another formulation is obtained, by using acetic acid to provide a second polyether polyol composition.

The properties of the obtained foams are summarized in table 4 hereinbelow.

TABLE 4

| Parameters | Acetic acid | Dibutyl hydrogen phosphate |
| --- | --- | --- |
| Cream time (s) | 17 | 18 |
| String time (s) | 137 | 150 |
| Free rise density (g/L) | 27.5 | 28 |

From table 4, the results show that the reactivity of the formulation using acetic acid is higher than when dibutyl hydrogen phosphate is used (String time).

Cream time refers to the time required for the reaction mixture to change from the liquid state to a creamy state and starts to foam (expand) subsequently.

String time is time from mixing to the instant at which it is possible to pull a string of polymer from the reacting mixture using a spatula.

Free rise density refers to density measured on foam samples made under atmospheric conditions (in the presence of blowing agents) according to ISO 845 or DIN 4102.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

As used herein, the singular forms "a", "an", and "the" include both singular and plural referents unless the context clearly dictates otherwise. By way of example, "an isocyanate group" means one isocyanate group or more than one isocyanate group.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of". This means that, preferably, the aforementioned terms, such as "comprising", "comprises", "comprised of", "containing", "contains", "contained of", can be replaced by "consisting", "consisting of", "consists".

Throughout this application, the term "about" is used to indicate that a value includes the standard deviation of error for the device or method being employed to determine the value.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Throughout this application, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Although the preferred embodiments of the invention have been disclosed for illustrative purpose, those skilled in the art will appreciate that various modifications, additions or substitutions are possible, without departing from the scope and spirit of the invention as disclosed in the accompanying claims.

The invention claimed is:

1. A process for providing a homogeneous polyether polyol composition comprising the following steps:
   providing a crude polyether polyol mixture comprising a polyether polyol and a Group IA or Group IIA metal ion;
   neutralizing said crude polyether polyol mixture by adding a strong acid to said mixture, resulting in a neutralised polyether polyol composition, which comprises said polyether polyol along with a salt of said Group IA or Group IIA metal ion and said strong acid; and
   providing said homogeneous polyether polyol composition
   wherein the strong acid is a pentavalent organic phosphorus compound and the salt is a phosphorus-containing compound based organic salt that is soluble in said homogeneous polyether polyol composition.

2. The process according to claim 1, wherein said crude polyether polyol mixture comprises the Group IA or Group IIA metal ion in an amount of up to 4800 ppm.

3. The process according to claim 1, wherein said pentavalent organic phosphorus compound is selected from the group consisting of an organic phosphoric acid, an organic phosphonic acid, an organic phosphinic acid, and derivatives and mixtures thereof.

4. The process according to claim 3, wherein said pentavalent organic phosphorus compound is selected from the group consisting of a mono-alkyl dihydrogen phosphate, a dialkyl hydrogen phosphate, an alkyl phosphonic acid, a dialkyl phosphonic acid, a dialkylphosphinic acid, and derivatives and combinations thereof.

5. The process according to claim 4, wherein said pentavalent organic phosphoric compound is selected from the group consisting of dimethyl hydrogen phosphate, methyl dihydrogen phosphate, diethyl hydrogen phosphate, ethyl dihydrogen phosphate, dipropyl hydrogen phosphate, propyl dihydrogen phosphate, dibutyl hydrogen phosphate, butyl dihydrogen phosphate, dipentyl hydrogen phosphate, pentyl dihydrogen phosphate, dihexyl hydrogen phosphate, hexyl dihydrogen phosphate, diheptyl hydrogen phosphate, heptyl dihydrogen phosphate, dioctyl hydrogen phosphate, octyl dihydrogen phosphate, bis(1-methylheptyl) hydrogen phosphate, 1-methylheptyl dihydrogen diphosphate, bis(2-ethylhexyl) hydrogen phosphate, 2-ethyl-hexyl dihydrogen phosphate, didodecyl hydrogen phosphate, dodecyl dihydrogen phosphate, dioleyl hydrogen phosphate, oleyl dihydrogen phosphate, dibenzyl hydrogen phosphate, benzyl dihydrogen phosphate, diphenyl hydrogen phosphate, phenyl dihydrogen phosphate, methyl phenyl hydrogen phosphate, nonyl phenyl hydrogen phosphate, butyl phenyl hydrogen phosphate, ethyl phenyl hydrogen phosphate, bis(p-nonylphenyl) hydrogen phosphate, p-nonylphenyl dihydrogen phosphate, butyl(2-ethylhexyl) hydrogen phosphate, 2-ethylhexyl dihydrogen phosphate, (1-methylheptyl) (2-ethylhexyl) hydrogen phosphate, (2-ethylhexyl) (p-nonylphenyl) hydrogen phosphate, methyl phosphonic acid, ethyl phosphonic acid, propyl phosphonic acid, butyl phosphonic acid, phenyl phosphonic acid, benzyl phosphonic acid, ethyl methyl phosphonic acid, butyl methyl phosphonic acid, 2-ethylhexyl butylphosphonic acid, 2-ethylhexyl (2-ethylhexyl) phosphonic acid, mono-2-ethylhexyl phenyl phosphonic acid, dibutylphosphinic acid, bis(2-ethylhexyl) phosphinic acid, bis(1-methylhepthyl) phosphinic acid, dioleylphosphinic acid, diphenylphosphinic acid, bis(p-nonylphenyl) phosphinic acid, butyl(2-ethylhexyl) phosphinic acid, (2-ethylhexyl) (1-methyl-heptyl) phosphinic acid, (2-ethyl-hexyl) (p-nonylphenyl) phosphinic acid, and mixtures thereof.

6. The process according to claim 1, wherein said strong acid has a pKa lower than 4.5.

7. The process according to claim 1, wherein the polyether polyol in the crude polyether polyol mixture is obtained by reacting a starting compound having at least one active hydrogen atom with at least one alkylene oxide.

8. The process according to claim 7, wherein said starting compound comprises 1 to 8 hydroxyl, primary or secondary amine groups.

9. The process according to claim 7, wherein said starting compound is selected from the group consisting of water, diethylene glycol, propylene glycol, dipropylene glycol, glycerol, diglycerol, polyglycerols, pentaerythritol, trimethylolpropane, diethanolamine, triethanolamine, sorbitol, mannitol, sucrose, ethylene diamine, oligomeric diphenyl methane diamine, toluene diamine, Mannich bases, and mixtures thereof.

* * * * *